United States Patent
Hickey et al.

(10) Patent No.: US 7,505,582 B2
(45) Date of Patent: Mar. 17, 2009

(54) HINGE MECHANISM HAVING MULTIPLE AXES OF ROTATION FOR POSITIONING OF A MOBILE COMMUNICATION DEVICE

(75) Inventors: Kurt M. Hickey, Sheboygan, WI (US); Ivan Nelson Wakefield, Cary, NC (US); William Kevin Carpenter, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 940 days.

(21) Appl. No.: 10/843,124

(22) Filed: May 11, 2004

(65) Prior Publication Data

US 2005/0141703 A1    Jun. 30, 2005

Related U.S. Application Data

(60) Provisional application No. 60/533,478, filed on Dec. 31, 2003.

(51) Int. Cl.
*H04M 1/00* (2006.01)
*H04M 9/00* (2006.01)

(52) U.S. Cl. ................. 379/433.13; 455/575.3

(58) Field of Classification Search ............ 379/419, 379/428.01, 433.01, 433.11, 433.13; 455/575.1, 455/575.3, 575.4; 16/302, 333
See application file for complete search history.

(56) References Cited

U.S. PATENT DOCUMENTS 6,658,272 B1    12/2003    Lenchik et al.

| | | |
|---|---|---|
| 2001/0004269 A1 | 6/2001 | Shibata et al. |
| 2003/0064685 A1 | 4/2003 | Kim |
| 2003/0078069 A1 | 4/2003 | Lindeman |
| 2004/0198474 A1 * | 10/2004 | Jung et al. ............... 455/575.1 |

FOREIGN PATENT DOCUMENTS

| EP | 1 126 709 | 8/2001 |
|---|---|---|
| JP | 2003-134212 | * 9/2003 |

OTHER PUBLICATIONS

Samsung SCH-V420; http://www.3gtoday.com/devices/devices/device1777.html.
http://perso.edeign.com/asiaphone/forum/index.php?s=8e69e090dcfd3b64a30f1b93d9aa6 . . . .
Kokoro; http://nkcp.zive.net/kokoro/archives/002181.html.
Nokia 6260; http://www.nokia.com/nokia/0,8764,58689,00.html.

* cited by examiner

*Primary Examiner*—Curtis Kuntz
*Assistant Examiner*—Tuan D Nguyen
(74) *Attorney, Agent, or Firm*—Coats & Bennett, P.L.L.C.

(57) ABSTRACT

A mobile communication device having a first section, a second section, and a hinge mechanism. Functional devices are positioned within the sections and provide for a multitude of uses. The sections are movable about a first axis of rotation and a second axis of rotation. The movement allows for positioning the sections in various orientations to use the functional devices. A method of using the device is also disclosed for moving the sections in a combination of flip motion, jack-knife motion, and twist motion about the first and second axis of rotation.

16 Claims, 13 Drawing Sheets

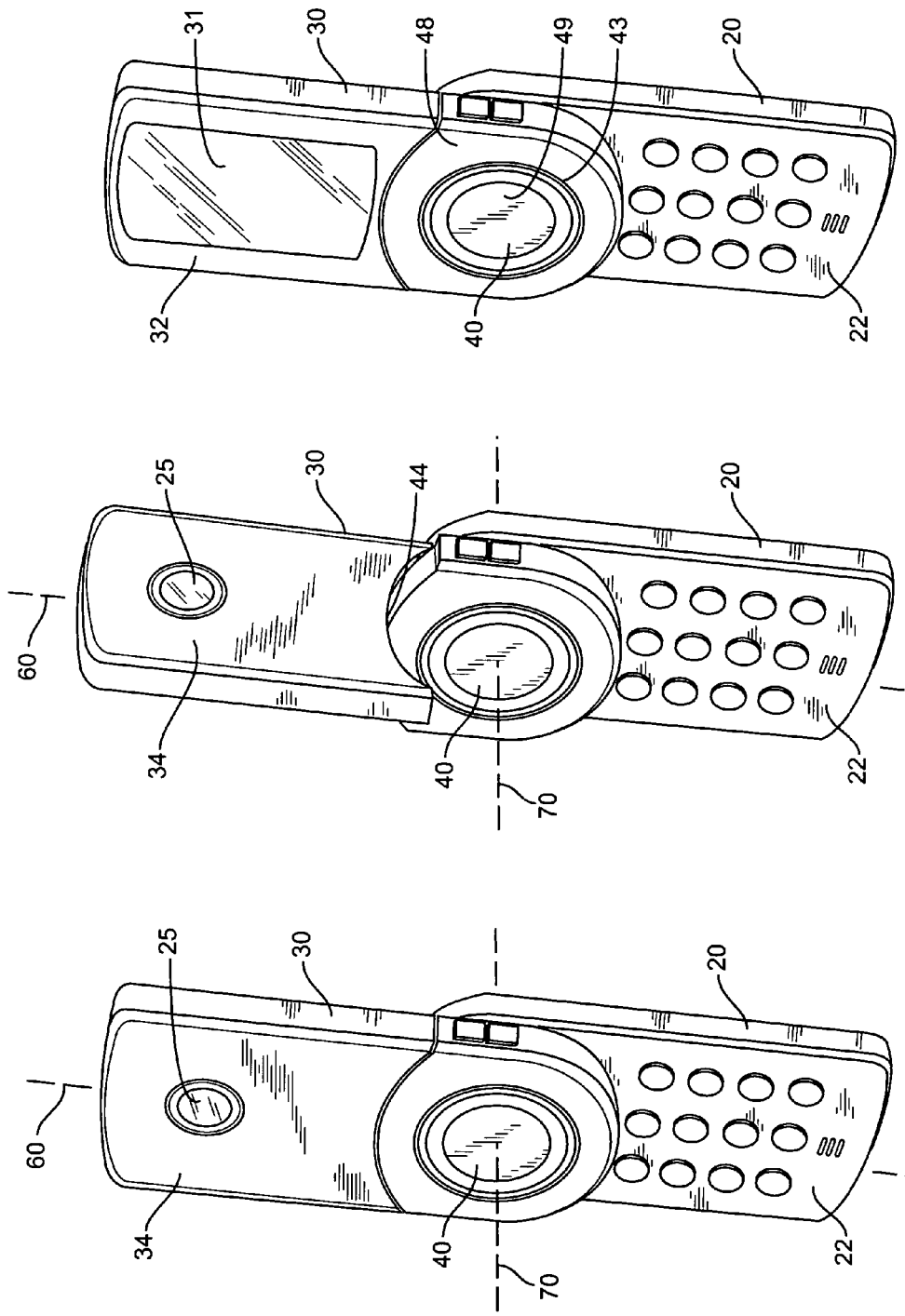

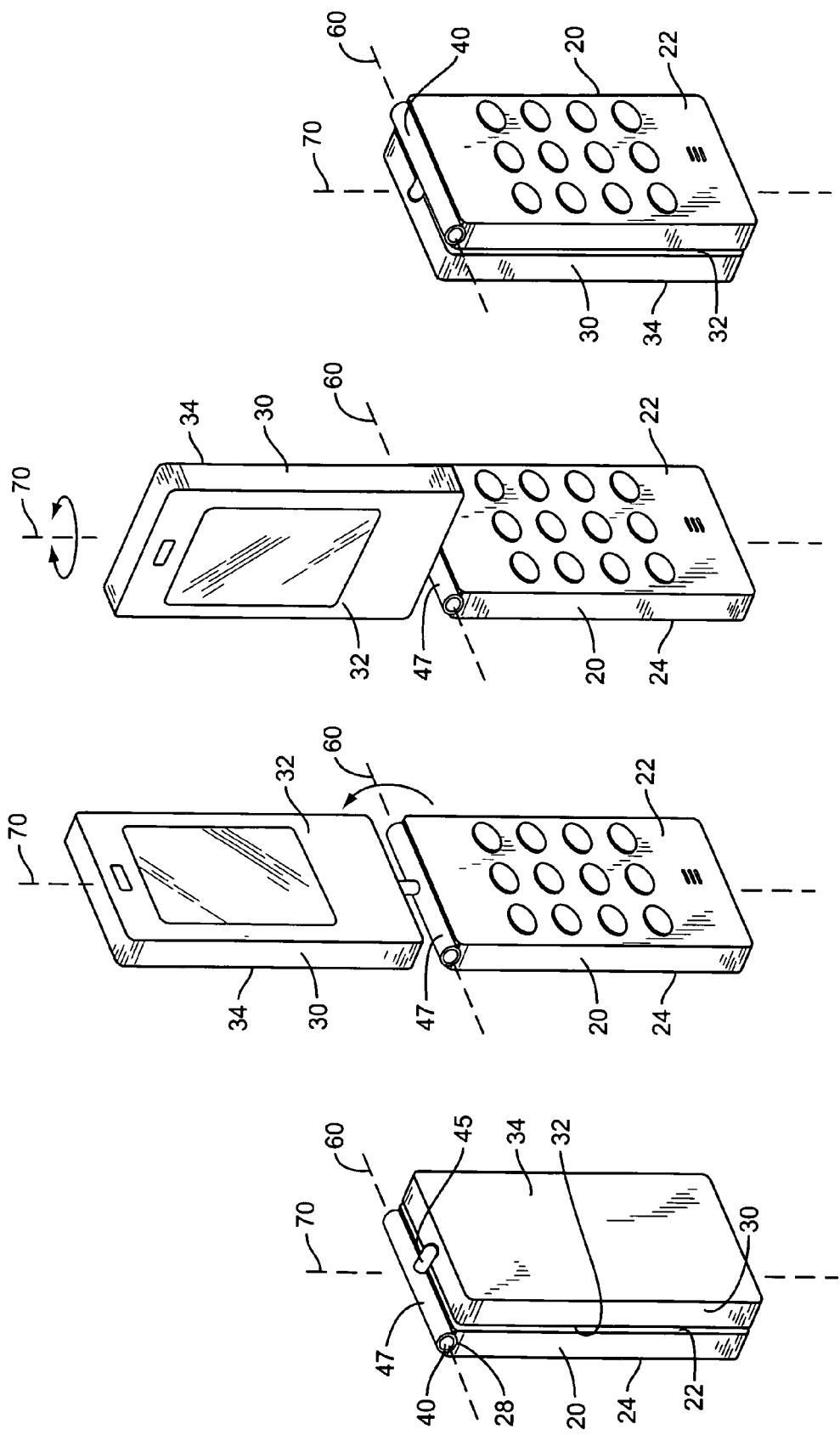

HINGE MECHANISM HAVING MULTIPLE AXES OF ROTATION FOR POSITIONING OF A MOBILE COMMUNICATION DEVICE

RELATED APPLICATIONS

This application claims priority under 35 U.S.C. § 119(e) from the following U.S. provisional application: Application Ser. No. 60/533,478 filed on Dec. 31, 2003. This application is expressly incorporated in its entirety by reference herein.

BACKGROUND

The present invention relates to a mobile communication device, and more particularly, to a hinge mechanism for selectively positioning the relative orientations of first and second sections of the device.

Mobile communication devices often include multiple functional devices housed within a single unit. By way of example, a single device may include video recording and display features in addition to the traditional mobile communication functionality. Often times these functions require the device to be configured in different orientations when using the different devices. The video recording and display features may require a lens to aim in a first direction, such as away from the operator, and a video display to face in a second direction, such as towards the operator for use as a viewfinder. The mobile communication features may require a microphone to be positioned adjacent to the mouth of the operator, while a speaker is positioned adjacent to the operator's ear.

The unit should be configurable to protect the various functional devices. When the device is in use, the functional devices are positioned to be accessed by the operator. When the device is not in use, it should be movable into a folded orientation with the functional devices shielded to prevent damage to the fragile elements. Additionally, the unit should have a reduced size so it is easily carried by the operator, such as in a pocket when in the folded orientation. The unit should also be easily adjustable between orientations.

The device should also be constructed such that it is durable to withstand the effects of being carried around by the operator. The devices may be dropped by the operator in both the open and folded orientations, be crushed such as when in the operators pocket when he or she sits down, and may also be exposed to a variety of weather elements. The device should be able to withstand these variety of stresses and still be operable.

The design of the mobile communication device should provide for adjustability, but not add excessively to the overall price of the device. Many consumers of these devices make their purchasing selections based on the cost of the device. Therefore, the increase in adjustability cannot add an unreasonable amount to the cost such that consumers will not purchase the device.

SUMMARY

The present invention is directed to a mobile communication device that is positionable in a variety of different orientations. The device includes a first section and a second section. The device includes different functional elements positioned within the sections. The functional devices may include an input device, a display, a camera, etc. A hinge mechanism connects the first and second sections and provides for movement along the two axes. The movement of the sections allows for the functional elements to be used in different combinations to optimize the performance of the device. The various types of movement along the axes may be referred to as a flip motion, a jack-knife motion, and a twist motion.

BRIEF DESCRIPTION OF THE DRAWINGS

FIGS. 10, 11, and 12 are perspective views of the device in another twist motion moving about an axis of rotation according to another embodiment of the present invention;

FIGS. 13, 14, 15, and 16 are perspective view of the device flipping from a first folded orientation to a second folded orientation;

DETAILED DESCRIPTION

Figure 1:
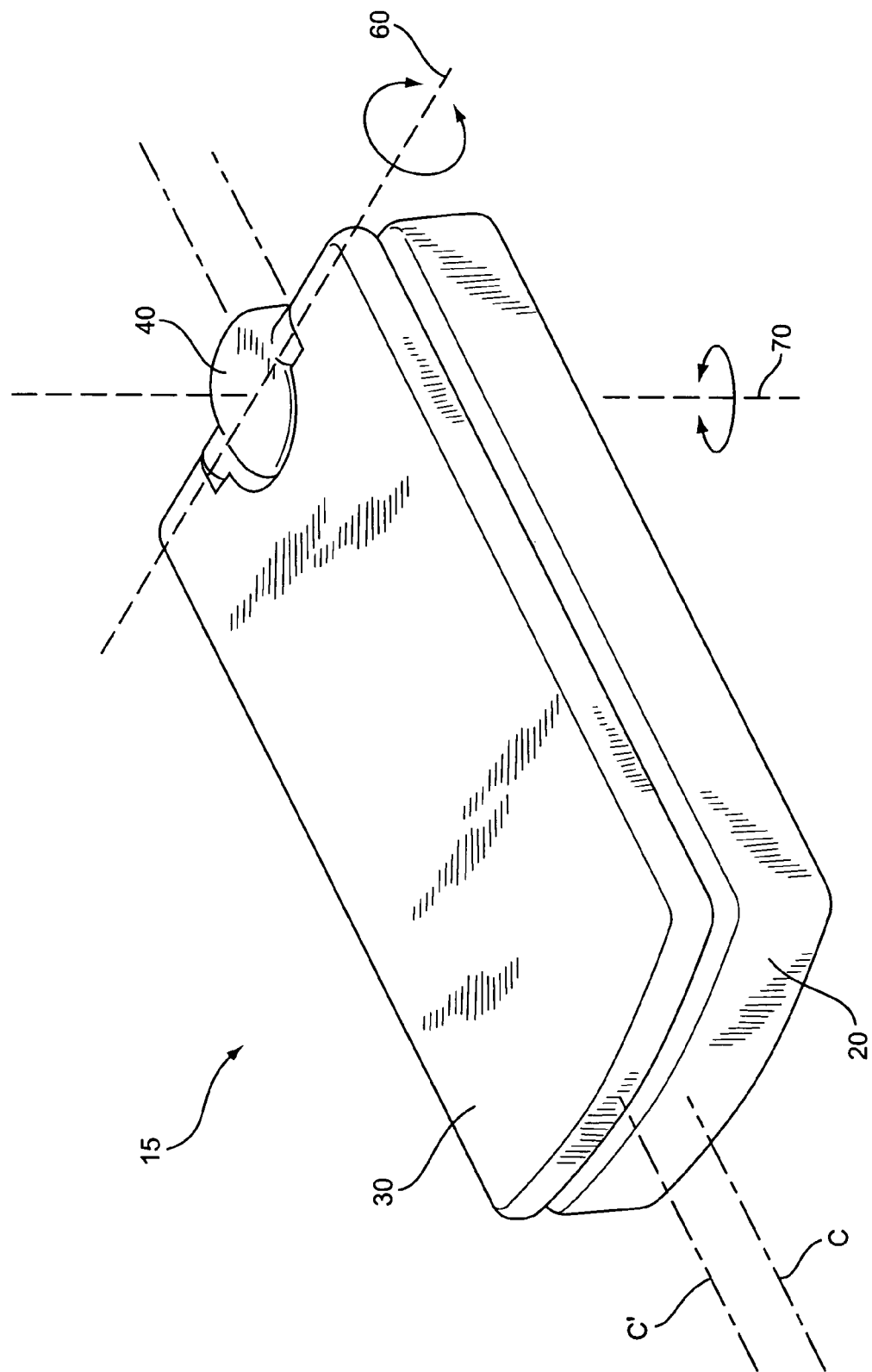
FIGS. 1, 2, and 3 are perspective views of a mobile communication device flipping about one axis of rotation according to one embodiment of the present invention.

The present invention is directed to a mobile communication device, generally illustrated as 15, having a first section 20 and a second section 30. Each section 20, 30 houses one or more functional devices. A hinge mechanism 40 adjustably connects the first and second sections 20, 30 to orient the functional devices in a variety of orientations. The hinge mechanism 40 is arranged to provide relative movement of the sections 20, 30 along at least two axes of rotation 60, 70.

In one embodiment, each of the first and second sections 20, 30 have faces to position one or more of the functional elements. By way of example as illustrated in the Figures, first section 20 includes a first face 22 and a second face 24. Second section 30 includes a first face 32 and a second face 34. Functional devices may be arranged in a variety of combinations between the first and second sections 20, 30. In one embodiment, the first section 20 includes an input device 23 on the first face 22 and an optical input 25 on the second face 24 for capturing visual images. The input device 23 may include a keypad, game controller with or without a joystick, or a pressure sensitive device for receiving inputs from the touch of an operator or a stylus. First face 22 may further include a microphone 26 for functioning during mobile communication. A display 31 is positioned on the second section first face 32 for showing video, still pictures, graphics, etc. Speaker 35 may further be positioned on the first face 32 for use in the mobile communication mode. The second face 34 may include a rigid housing for protecting the functional elements.

The shapes and sizes of the sections 20, 30 may vary. In the embodiments illustrated, the sections 20, 30 are substantially flat and have substantially the same size. Other embodiments may include the first and second sections 20, 30 having different shapes and sizes.

The sections 20, 30 are movable between folded and open orientations. FIG. 1 illustrates one embodiment of the folded orientation with the first section 20 positioned substantially against the second section 30. The sections 20, 30 have complimentary shapes such that the device 15 has an overall compact size in the folded orientation. The adjacent faces of the sections 20, 30 may contact when the device 15 is in the folded orientation, or may be positioned a slight distance apart. A separation plane is the plane formed by the two sections 20, 30 in the folded orientation. The open orientation comprises the second section 30 rotated from the first section 20 with an angle α defined by a first section centerline C and a second section centerline C' being substantially between 90° and 180°.

Sections 20, 30 are relatively movable about axes of rotation 60, 70. For ease of explanation, the axes are referred to as first axis of rotation 60, and second axis of rotation 70. Axes of rotation 60, 70 define the relative movement of the sections 20, 30, and are not used to define the movement of the sections within a particular plane. The axes of rotation 60, 70 may be aligned at various angles relative to one another, and to the centerlines C, C'. Again for ease of explanation, the relative movement of the sections 20, 30 is explained by the first section 20 remaining stationary relative to the movement of second section 30.

Hinge mechanism 40 is connected to each section 20, 30 to allow movement into the various orientations. Hinge mechanism 40 may be positioned at a variety of locations relative to the sections 20, 30. Hinge mechanism 40 provides for movement of the second section 30 relative to the first section 20 along at least two axes 60, 70.

Figure 2:
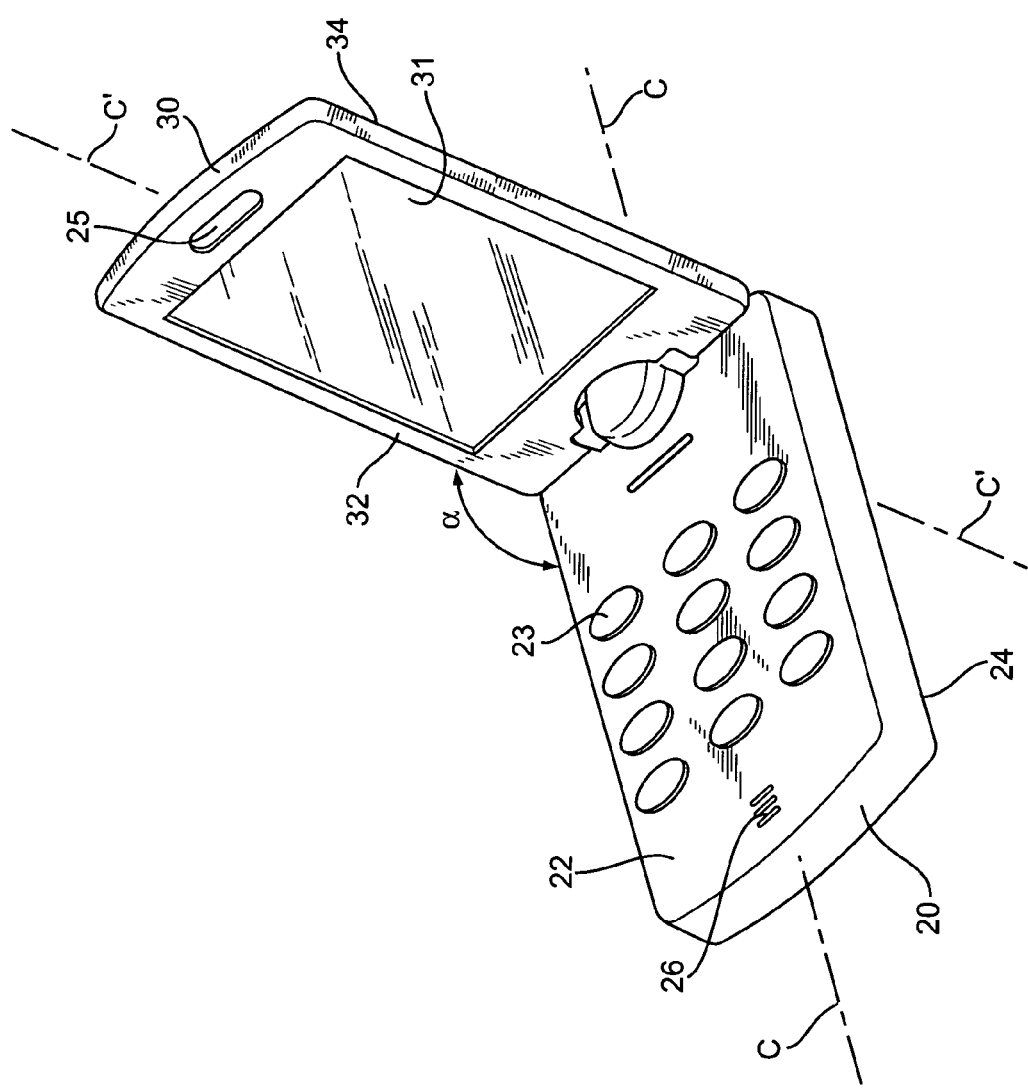
Figure 3:
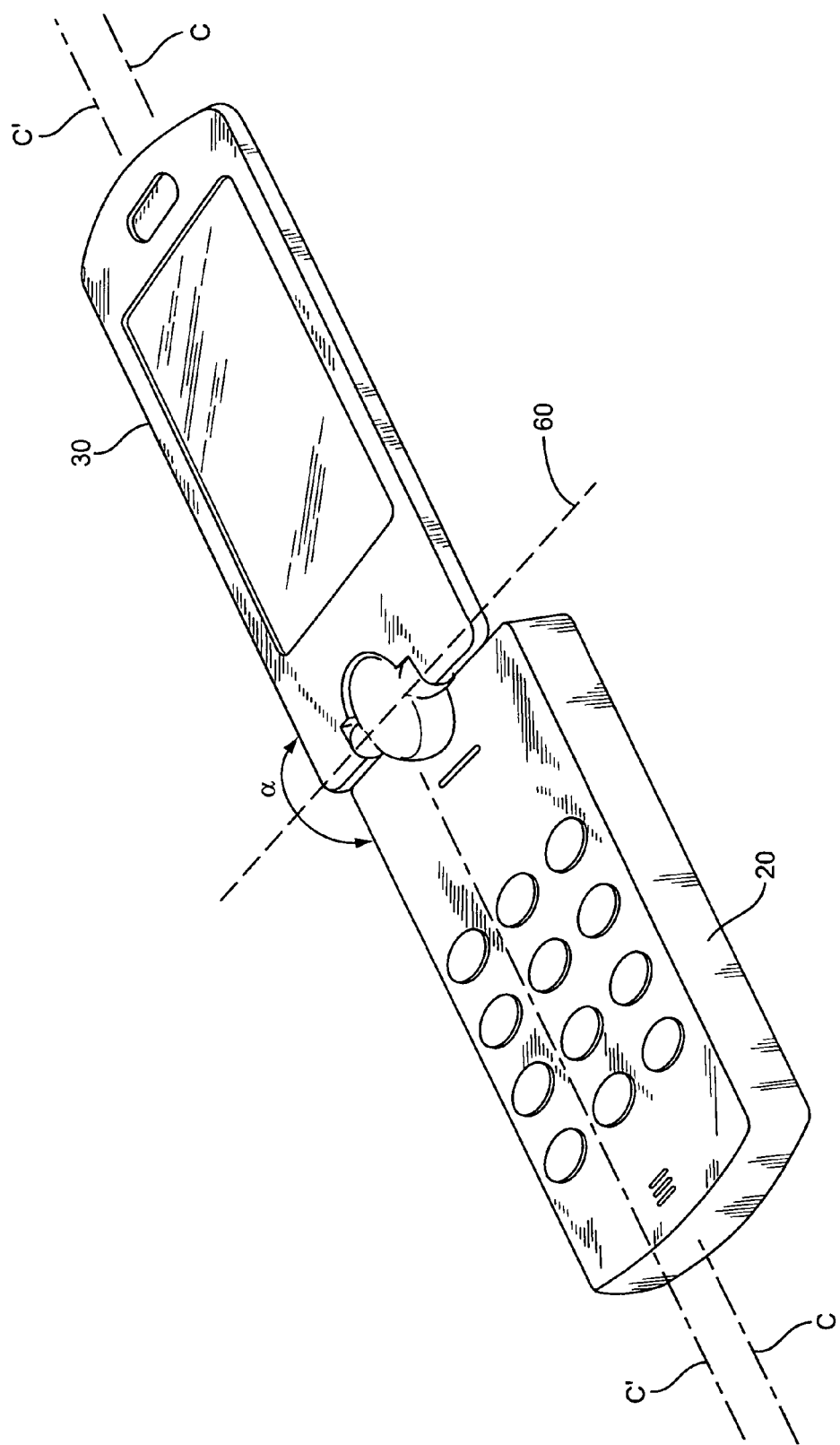

FIGS. 1, 2, and 3 illustrate a first range of motion of the sections 20, 30 about the first axis 60. This range of motion is referred to as a flip motion. FIG. 1 illustrates the folded orientation with the two sections 20, 30 being in an overlapping configuration. Centerline C of the first section 20 is substantially parallel with centerline C' of the second section 30. FIG. 2 illustrates the second section 30 rotated about axis 60 to a second position. In one embodiment, this is the open position with angle a being approximately 90°. In this orientation, centerline C of the first section 20 is substantially perpendicular with centerline C' of the second section 30 and forms an "L" shape. FIG. 3 illustrates another open position with the second section 30 rotated a greater amount about first axis 60 with angle a being substantially 180°. In this orientation, centerline C is again parallel with the centerline C'. Hinge mechanism 40 may further include steps to position the second section 30 at a range of angles α relative to the first section 20 for ease and convenience for the operator.

Figure 4:
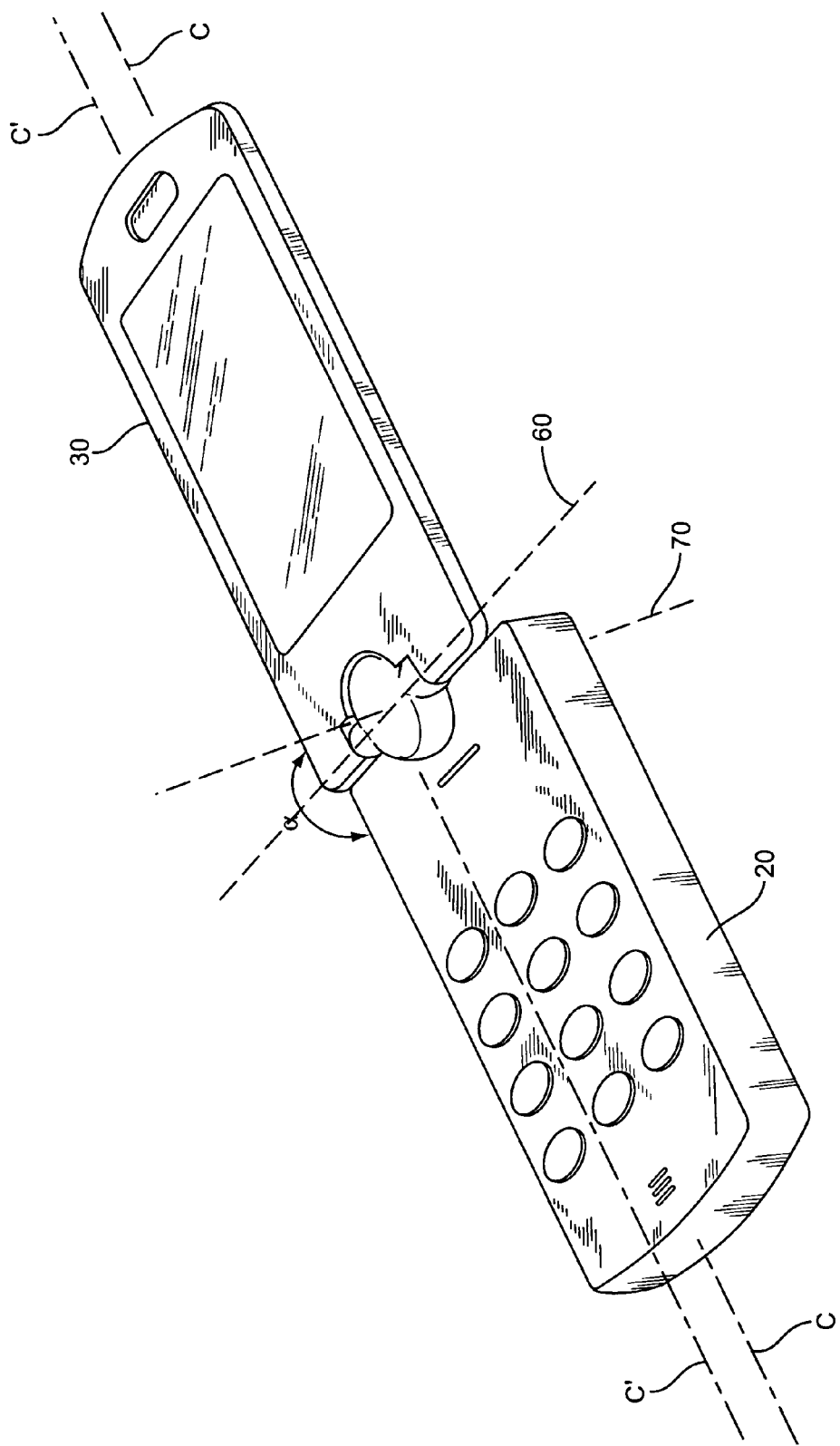
FIGS. 4, 5, and 6 are perspective views of the device in a jack-knife motion moving about an axis of rotation according to another embodiment of the present invention.
Figure 5:
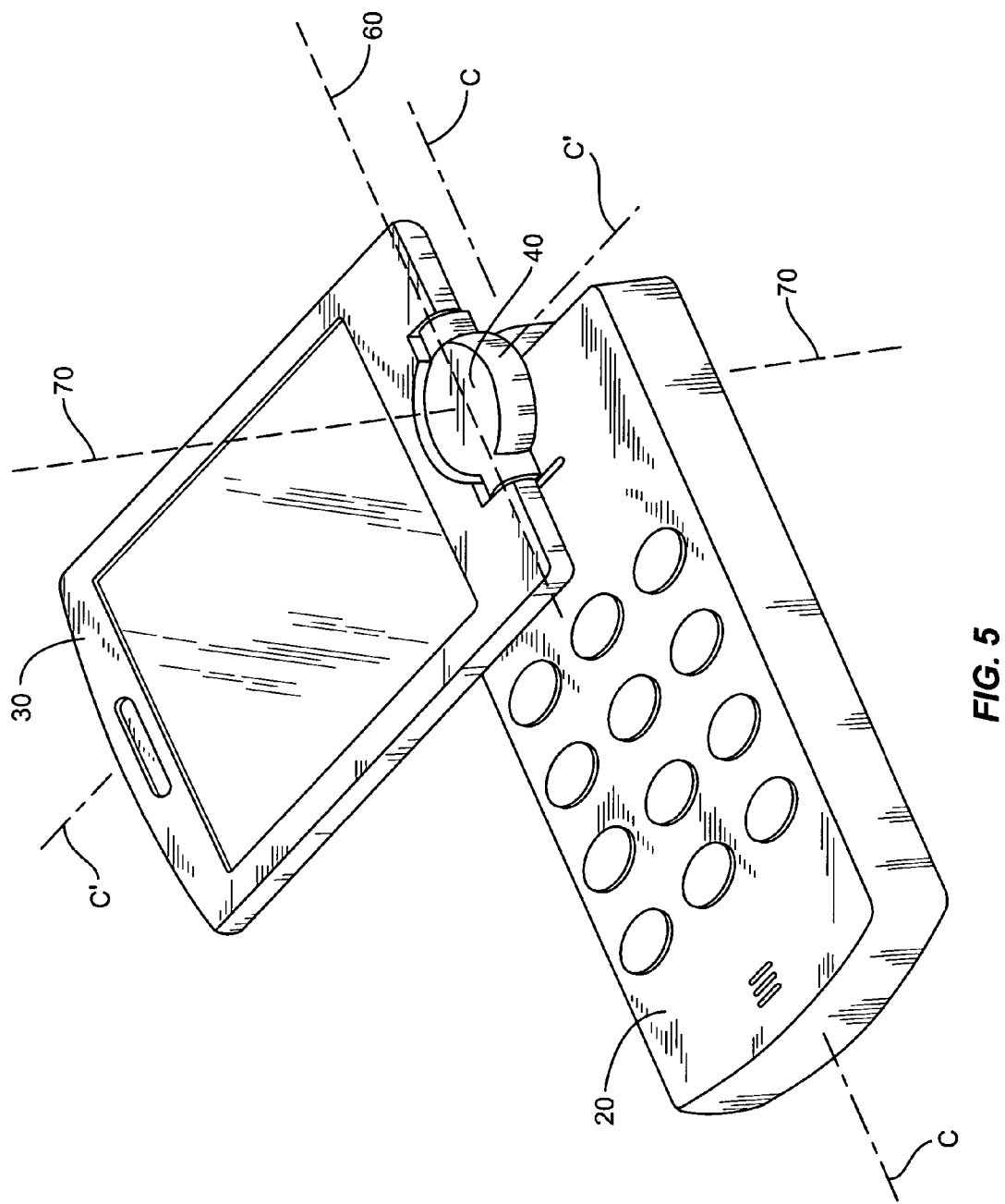
Figure 6:
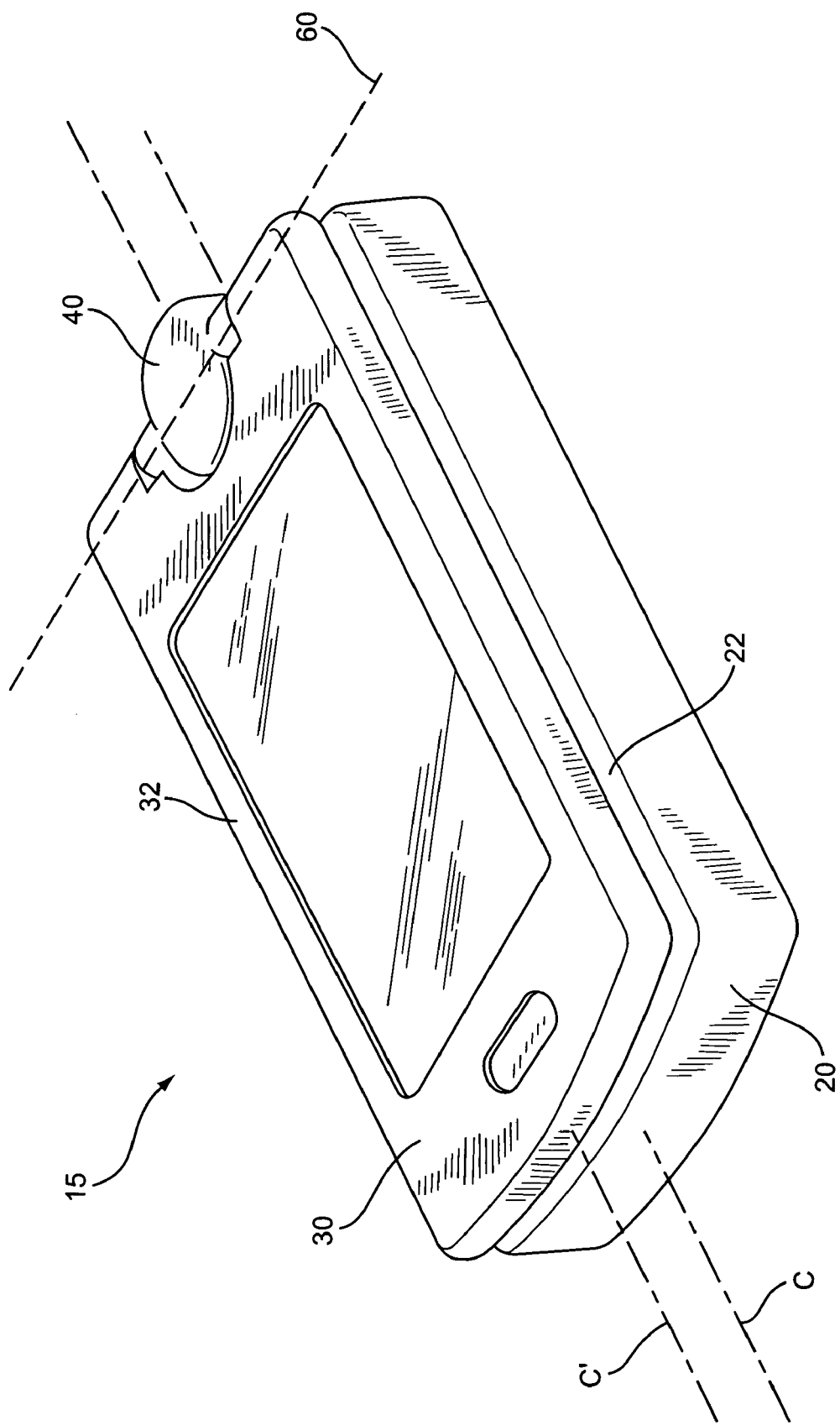

FIGS. 4, 5, and 6 illustrates the device of the previous Figures having a second range of motion of sections 20, 30 relative to the second axis 70. The motion of FIGS. 4, 5, and 6 is referred to as a twist. FIG. 4 illustrates the device 15 in the open orientation with the angle α being substantially 180°. The centerline C of the first section 20 is also parallel with a centerline C' of the second section 30. FIG. 5 illustrates the second section 30 being rotated about the second axis 70 to a position where the centerline C of the first section 20 is substantially perpendicular to the centerline C' of the second section 30. FIG. 6 illustrates the motion being completed with the device 15 in the folded orientation. The centerline C of the first section 20 is parallel with the centerline C' of the second section 30.

The particular motion of FIGS. 4, 5, and 6 is referred to as a jack-knife motion. The jack-knife motion maintains a plane formed by the second section 30 substantially parallel with a plane formed by the first section 20 during the range of motion.

Figure 7:
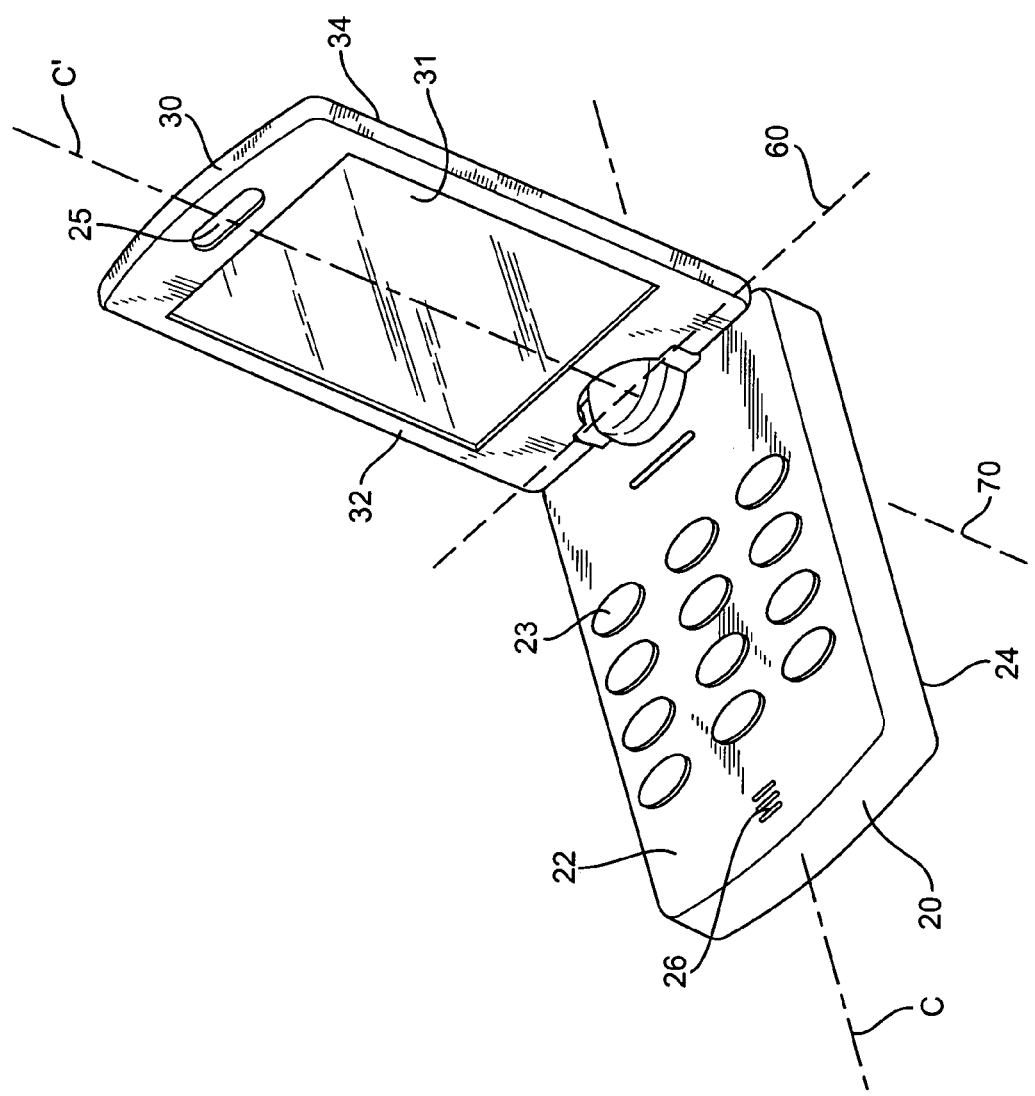
FIGS. 7, 8, and 9 are perspective views of the device in a twist motion moving about an axis of rotation according to another embodiment of the present invention.
Figure 8:
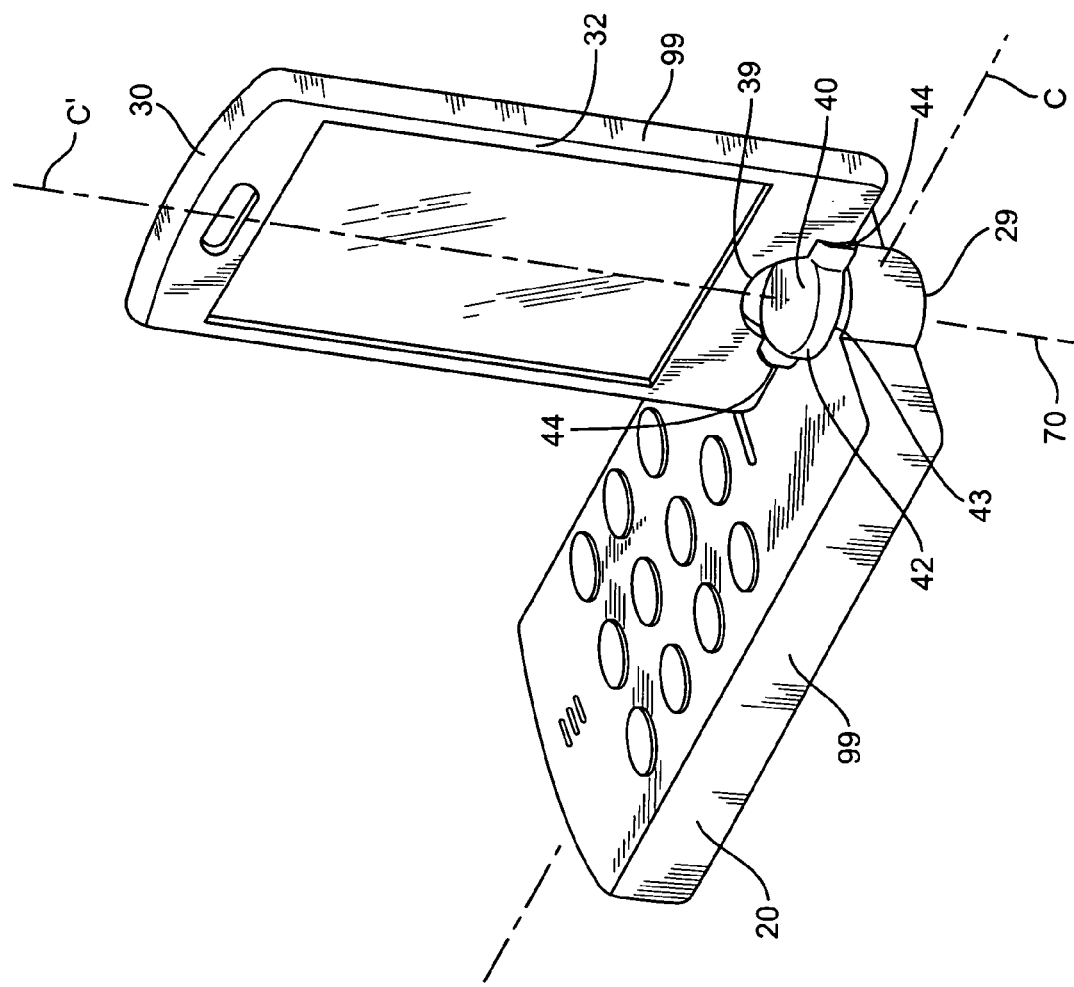
Figure 9:
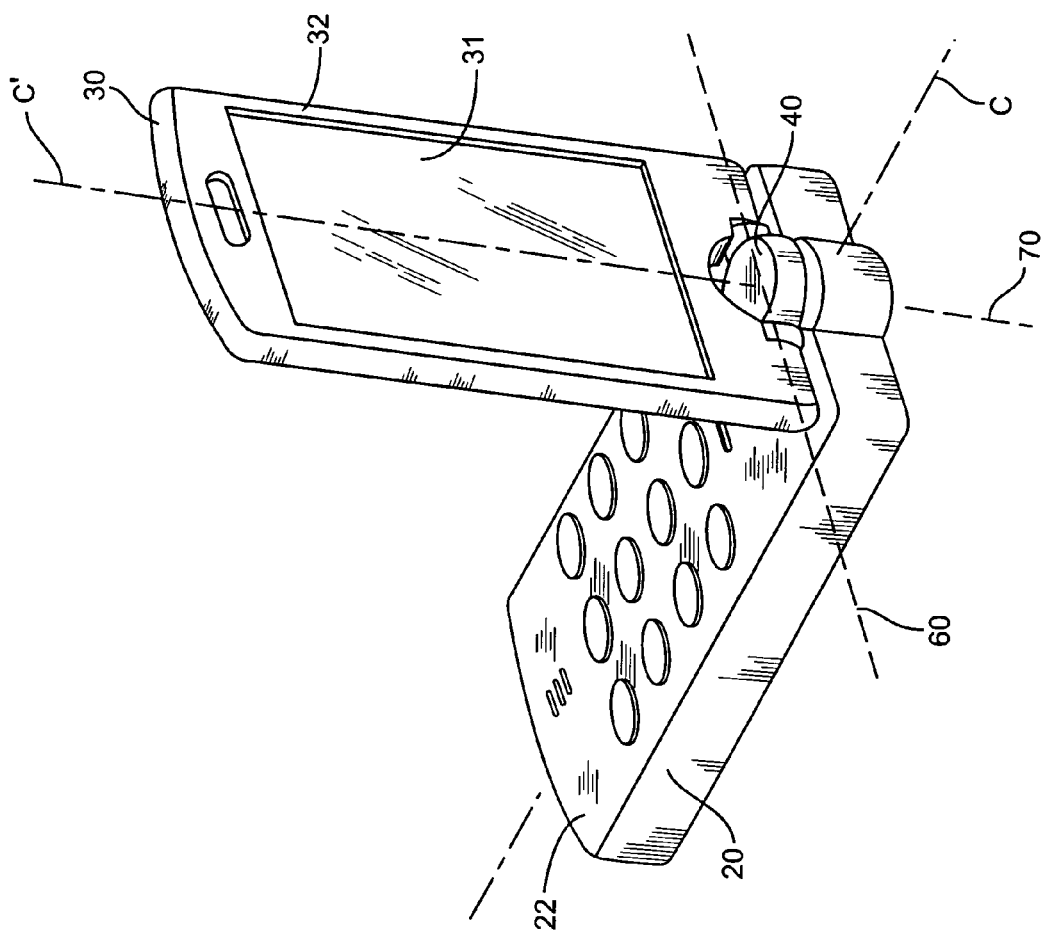

FIGS. 7, 8, and 9 illustrate another twist motion. FIG. 7 illustrates the device 15 in an open position with a first face 32 facing towards a first face 22 of the first section 20. This is the same orientation as illustrated during the flip motion of FIG. 2. FIG. 8 illustrates the second section 30 being partially twisted about the second axis 70 with the body of the second section 30 rotating through a point at which it is parallel with the centerline C of the first section 20. FIG. 9 illustrates the twist motion completed with the second face 34 now facing towards the first face 22 of the first section 20. In each of the progressions of FIGS. 7, 8, and 9, the centerline C of the first section 20 remains substantially at the same relative angle to the centerline C' of the second section 30. From the position illustrated in FIG. 9, the second section 30 can be flipped about the first axis 60 to the folded orientation or a further open position with the angle α being increased.

Another embodiment illustrating a twist motion is shown in FIGS. 10, 11, and 12. First axis 60 extends within the plane of the first and second sections 20, 30 substantially parallel to the centerlines C and C', and second axis 70 is substantially perpendicular to the plane of the sections 20, 30 and to the centerline C'. In this progression, the device 15 is in the open orientation as illustrated in FIG. 10 with the second section 30 extending outward from the first section 20 and the second face 34 facing in the same direction as the first face 22. FIG. 11 illustrates the second section 30 being partially twisted about axis 60 with the second face 34 being substantially perpendicular to the first face 22 and forming a "+" shape. FIG. 12 illustrates the final position with the second section 30 being rotated 180° from the starting position with the first face 32 of the second section 30 facing in the same direction as the first face 22 of the first section 20.

Use of the device 15 may include a variety of different movements to arrange the orientation of the first and second faces 22, 24, 32, 34 of the sections 20, 30. In one embodiment, the device 15 starts in a folded orientation with the first face 22 and the first face 32 facing opposite directions. The device 15 is then flipped to an open position with an angle a being about 90°. Device 15 then twists along a second axis 70 such that the first face 32 faces away from the first face 22. Finally, device 15 flips further along the first axis 60 with the second section 30 extended from the first section and the first face 22 facing in an opposite direction of first face 32.

In another embodiment, device 15 starts in a folded orientation with the first face 32 facing in an opposite direction as first face 22. The device moves in a jack-knife motion along a first axis 60 to an open position with the first faces 32, 22 still facing in opposite directions. Device is then flipped along a second axis 70 to a folded orientation with the first faces 32, 22 facing in the same direction. Various embodiments are available with the sections 20, 30 moving along first and second axes 60, 70 to orient the faces 22, 24, 32, 34 and functional devices.

Hinge mechanism 40 provides for the movement of the sections 20, 30 around the axes 60, 70. One embodiment of the hinge mechanism 40 is best viewed in FIGS. 8, 9, 17 and 18. A body 42 is positioned above the first face 22 and is attached to the first section 20 through a connection 43. Connection 43 is pivotable relative to the first section 20 to rotate about one axis 70. A second connection 44 attaches the hinge mechanism 40 to the second section 30 and allows for rotation about axis 60. Each of the connections 43, 44 may attach to the sections 20, 30 at one or more points. By way of example, connection 43 comprises a single connection point between the body 42 and section 20, while connection 44 includes two connection points between the body 42 and section 30.

Hinge mechanism 40 may be positioned at a variety of positions relative to the sections 20, 30. In the embodiment of FIGS. 8 and 9, body 42 is positioned on the first face 22. Body 42 may have a variety of shapes, sizes, and positions. Body 42 may be positioned to extend over an edge of the sections 20, 30, or may be sized to remain within one of the faces to which it is mounted. A protrusion 29 may further extend outward from one section to support the body 42. Body 42 may also be positioned on the second face 24, or on the faces 32, 34 of the second section 30. In another embodiment, body 42 is positioned on an edge 99 of one of the sections 20, 30. An opening 39 that conforms to the shape of the body 42 may be cut into one of the sections 20, 30 to allow the section 30 pivot about the body 42 with the edge of the opening 39 not coming in contact with the body 42 during movement.

A two-piece hinge mechanism 40 is illustrated in FIGS. 10, 11, and 12. A prime section 49 remains stationary relative to the first section 20. A secondary section 48 is movably connected to the prime section 49 and rotates as the second section 30 moves about the second axis of rotation 70. The second section 48 remains stationary relative to the prime section 49 as the second section 30 twists about the axis 60. Rotary connections 43 connect the prime section 49 to the secondary section 48. A second connection 44 connects the second section 48 to the second section 30.

Figure 18:
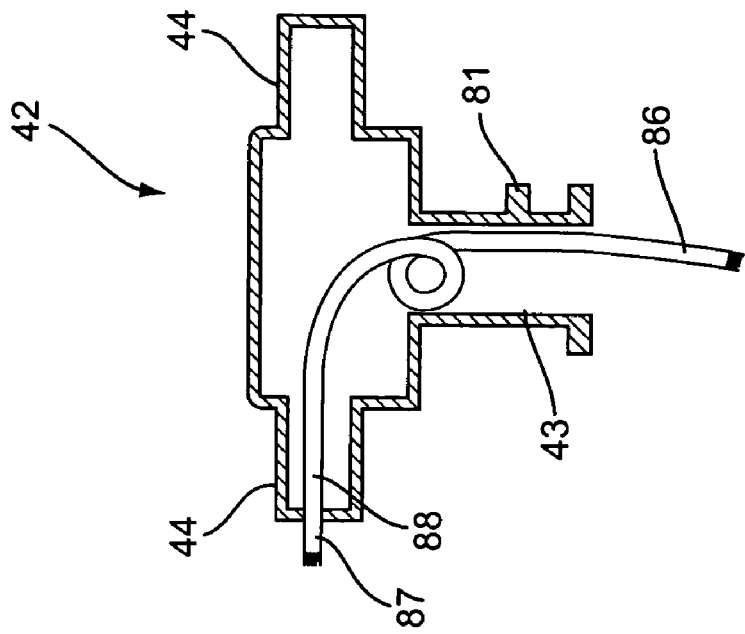
FIG. 18 is a side view of another embodiment of the hinge mechanism.
Figure 17:
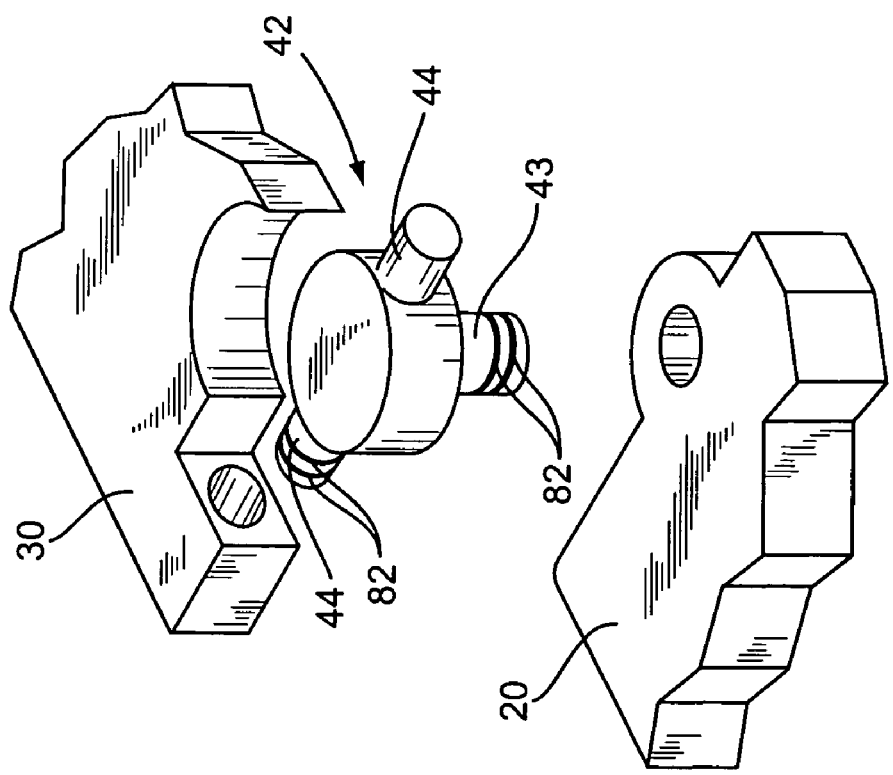
FIG. 17 is a partial perspective view of one embodiment of a hinge mechanism.

Hinge mechanism 40 further allows for electrical contact to be maintained between the first and second sections 20, 30. FIG. 17 illustrates one embodiment having slip rings 82 mounted on the hinge mechanism 40. Corresponding contacts are positioned within the first section 20 and second sections 30 that maintain contact with the slip rings 82 as the device 15 moves about the axes of rotation 60, 70. The embodiment of FIG. 17 illustrates the slip rings 82 mounted on the hinge mechanism 40. In another embodiment, slip rings 82 are mounted within the sections 20, 30 and connect with contacts on the hinge mechanism 40. FIG. 18 illustrates another embodiment having a flexible electrical conductor 88 routed through the hinge mechanism 40 and having first and second ends 86, 87. The first and second ends 86, 87 are operatively connected respectively to the first section 20 and second section 30. In yet another embodiment, first and second sections 20, 30 maintain electrical contact through a wireless connection.

The hinge mechanism 40 and electrical contacts may allow for free rotation of the sections 20, 30 about the first and second axes 60, 70. Free rotation allows for the second section to rotate endlessly in the same direction about an axis. In one embodiment, slip rings 82 are used for free rotation. Using the embodiment of FIGS. 10, 11, and 12, second section 30 can be twisted about axis 60 endlessly in a counterclockwise direction. Alternatively, sections 20, 30 may rotate only a limited amount in any direction and then should return in an opposite movement. By way of example, and again using the embodiments of FIGS. 10, 11, and 12, second section 30 can rotate counterclockwise about axis 60 only two complete rotations. At this point, either hinge mechanism 40 or the electrical contacts become constrained and do not allow for further rotation. The second section 30 should then be rotated clockwise about axis 60 to remove the constraint. A tab 81 may extend from the hinge mechanism 40 to contact the first and/or second sections 20, 30 to limit the amount of rotation.

FIGS. 13, 14, 15, and 16 illustrate another embodiment with the device 15 moving from a first folded position to a second folded position. A first folded position is illustrated in FIG. 13 with the second section 30 on a first side of the first section 20. A first face 22 is adjacent to the second face 32 and facing in an opposite direction. FIG. 14 illustrates the second section 30 flipping about axis 60 to an open orientation with the first face 32 facing in the same direction as the first face 22. FIG. 15 illustrates the second section 30 twisting about axis 70 with the plane formed by the second section 30 being substantially perpendicular to the plane formed by the first section 20. FIG. 16 illustrates the second section 30 being in a second folded position on a second side of the first section 20. From FIG. 13 to FIG. 16, the second section 30 has be twisted about axis 70 a total of 180° and folded about axis 60 about 180°. In the second folded position as illustrated in FIG. 16, the first face 22 is facing in the same direction as the first face 32.

In another embodiment, the second section 30 is moved about axis 60 with no rotation about axis 70. In the first folded position of this embodiment, the first face 22 and the first face 32 are facing in opposite directions as illustrated in FIG. 13. In the second folded position of this embodiment, the first face 22 and the first face 32 are facing in opposite directions (the same orientation as illustrated in FIG. 6).

In the embodiment of FIGS. 13, 14, 15, and 16, hinge mechanism 40 includes a first hinge 47 mounted at an edge of the first section 20 within a receptacle 28. The first hinge 47 and receptacle 28 provide for rotation about axis 60. A pivoting member 45 connects the first hinge 47 to an edge of the second section 30 for rotation about the second axis 70. In another embodiment (not illustrated), hinge mechanism 40 includes a ball joint having a round member that mounts within a receiver.

Figure 19:
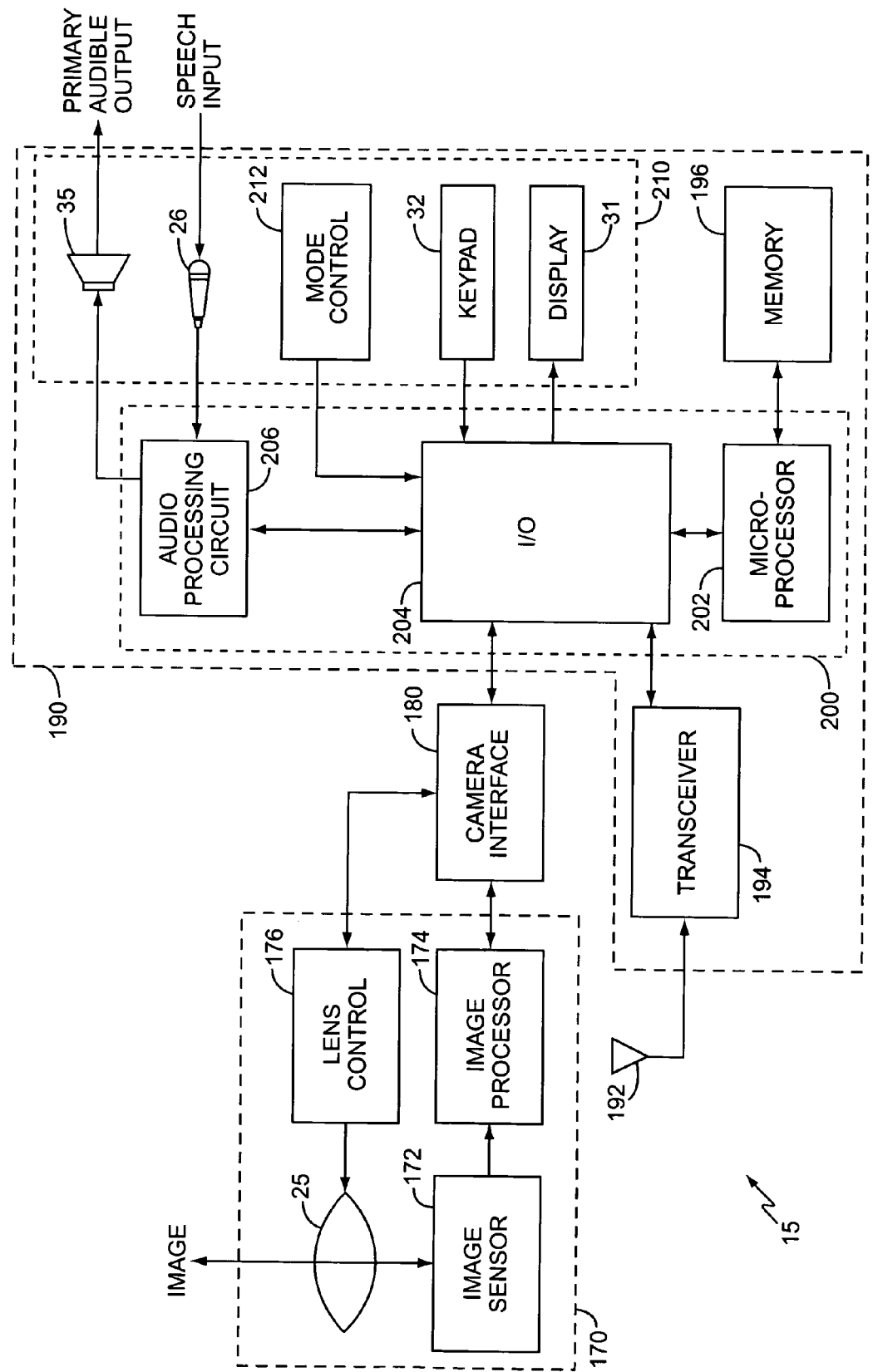
FIG. 19 is a block diagram of an exemplary mobile communication device according to one embodiment of the present invention.

FIG. 19 illustrates a block diagram for an exemplary mobile device 100 according to the present invention. Mobile device 15 comprises a camera assembly 170, camera and graphics interface 180, and a communication circuit 190. Camera assembly 170 includes an optical input 25, image sensor 172, image processor 174, and lens control 176. Camera lens 25, comprising a single lens or a plurality of lenses, collects and focuses light onto image sensor 172 in response to control signals from lens control 176. Lens control 176 may control optical input 25 by, for example, changing the focus of the optical input 25 in response to an automatic focus function or in response to user input. Image sensor 172 captures images formed by light collected and focused by optical input 25. Image sensor 172 may be any conventional image sensor 172, such as a charge-coupled device (CCD) or a complementary metal oxide semiconductor (CMOS) image sensor. Image processor 174 processes raw image data captured by image sensor 172 for subsequent storage in memory 196, output to a display 31, and/or for transmission by communication circuit 190. The image processor 174 may be a conventional digital signal processor programmed to process image data, which is well known in the art.

Image processor 174 interfaces with communication circuit 190 via camera and graphics interface 180. Communication circuit 190 comprises antenna 192, transceiver 194, memory 196, microprocessor 202, input/output circuit 204, audio processing circuit 206, and user interface 210. Transceiver 194 is coupled to antenna 192 for receiving and transmitting signals. Transceiver 192 is a fully functional cellular radio transceiver, which may operate according to any known standard, including the standards known generally as the Global System for Mobile Communications (GSM), TIA/EIA-25, cdmaOne, cdma2000, UMTS, and Wideband CDMA.

Microprocessor 202 controls the operation of mobile device 15, including transceiver 194, according to programs stored in memory 196. The control functions may be implemented in a single microprocessor, or in multiple microprocessors. Suitable microprocessors may include, for example, both general purpose and special purpose microprocessors and digital signal processors. Memory 196 represents the entire hierarchy of memory in a mobile communication device, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 202.

Input/output circuit 204 interfaces microprocessor 202 with image processor 174 of camera assembly 170 via camera and graphics interface 180. Camera and graphics interface 180 may also interface image processor 174 with user interface 210 according to any method known in the art. In addition, input/output circuit 204 interfaces microprocessor 202, transceiver 194, audio processing circuit 206, and user interface 210 of communication circuit 190. User interface 210 includes a display 31, speaker 35, microphone 26, and input device 23. Display 31 allows the operator to see dialed digits, images, called status, menu options, and other service information. Input device 23 may include an alphanumeric keypad and may optionally include a navigation control, such as joystick control (not shown) as is well known in the art. Further, input device 23 may comprise a full keyboard, such as those used with palmtop computers. Input device 23 allows the operator to dial numbers, enter commands, and select options.

Microphone 26 converts the operator's speech into electrical audio signals. Audio processing circuit 206 accepts the analog audio inputs from microphone 26, processes these signals, and provides the processed signals to transceiver 194 via input/output 204. Audio signals received by transceiver 194 are processed by audio processing circuit 206. The basic analog output signals produced by processed audio processing circuit 206 are provided to speaker 35. Speaker 35 then converts the analog audio signals into audible signals that can be heard by the operator.

User interface 210 may also include mode control 212. Mode control 212 selectively activates an operational mode for mobile device 15 in response to user input and/or the orientation of the first and second sections 20, 30. The operational modes may include, for example, a stand-by mode, a communication mode, and a camera mode. A stand-by mode is defined as the mode where mobile device 15 operates in a reduced power mode while waiting for user input and/or for communication signals from a wireless network. A communication mode is defined as the mode where mobile device 15 operates as a wireless communication device capable of transmitting and receiving data in a wireless communication system. A camera mode is defined as the mode where the device 15 selectively captures, displays, stores, and/or manipulates images.

In exemplary embodiments, the operational mode of mobile device 15 may be determined by the orientation of the first and second sections 20, 30. In these embodiments, mode control 212 detects the angular position of sections 20, 30 relative to one another and activates the appropriate mode based on the detected position. For example, mode control 212 may activate a stand-by mode when mobile device 15 is positioned in the folded orientation, a communication mode when mobile device 15 is positioned in a first open orientation, and a camera mode when mobile device 15 is positioned in the second open orientation. Alternatively, the user may select the operational mode of mobile device 15 from a menu on display 31. Further, some embodiments may allow a user to select a combination communication and camera mode, for example, by orienting the mobile device 15 in the open orientation and selecting a video teleconference option from a menu on the display 31.

Those skilled in the art will appreciate that one or more elements shown in FIG. 19 may be combined. For example, while the camera and graphics interface 180 is shown as a separated component in FIG. 19, it will be understood that camera and graphics interface 180 may be incorporated with input/output circuit 204. Further, microprocessor 202, input/output circuit 204, audio processing circuit 206, and/or memory 196 may be incorporated into a specially designed application-specific integrated circuit (ASIC) 200.

As mentioned above, the present invention applies to a variety of mobile communication devices. As such, the present invention is not limited to the specific configurations illustrated. Further, input device 23 and other user interface elements, such as speaker 35 and microphone 26 may be located anywhere on first and second sections 20, 30. The optical input 25 may be positioned on the second face 34, or a second camera may be positioned on the second face 34.

The Figures illustrate an exemplary mobile device 15 according to the present invention. Mobile devices utilized with the present invention may comprise a variety of known mobile communication device or portable electronic devices. Such mobile devices include, but are not limited to, cellular telephones, persona data assistants (PDA), personal communication service (PCS) devices, palm-top computers, and the like.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A mobile communication device comprising:
    a first housing section having a first face and a second face;
    a second housing section having a first face and a second face;
    a hinge mechanism having first and second axes of rotation connecting the first and second housing sections so as to be movable between first and second folded positions, the second axis of rotation remaining substantially parallel to a separation plane between the first and second housing sections when the second housing section rotates about the first axis of rotation;
    wherein, in the first folded position, the first and second housing sections are folded with the first face of the first housing section and the first face of the second housing section facing opposite directions; and
    wherein, in the second folded position, the first and second housing sections are folded with the first face of the first housing section and the first face of the second housing section facing in a common direction.

2. The device of claim 1, wherein the first axis of rotation is fixed.

3. The device of claim 1, wherein the second axis of rotation is perpendicular to the separation plane in the first and second folded positions.

4. The device of claim 1, wherein the first axis of rotation provides approximately 180 degrees of rotation between the first housing section and the second housing section.

5. The device of claim 1, wherein the second axis of rotation provides approximately 360 degrees of rotation between the first housing section and the second housing section.

6. The device of claim 1, wherein the first axis of rotation is transverse to the first housing section, and wherein the second housing section is positionable in an open orientation extended from the first housing section with the first housing section first face and the second housing section first face facing in the same direction.

7. The device of claim 6, wherein planes formed by the first and second housing sections are substantially parallel in the first and second folded positions.

8. The device of claim 1, wherein the first housing section comprises an input device, and wherein the second housing section comprises a display.

9. The device of claim 1, wherein the second section is on a first side of the first section in the first folded position and on a second side of the first section in the second folded position.

10. The device of claim 1, wherein the second housing section is on a first side of the first housing section in both the first folded position and the second folded position.

11. The device of claim 1, wherein the first and second axes of rotation are substantially perpendicular.

12. The device of claim 1, wherein the second axis of rotation is substantially perpendicular to a separation plane between the first and second housing sections in the first and second folded positions.

13. The device of claim 12, wherein the second axis of rotation is fixed.

14. The device of claim 12, wherein the first axis of rotation is movable.

15. The device of claim 1, wherein the hinge mechanism operatively connects the first housing section and the second housing section and provides for unlimited rotation about one of the first and second axes of rotation.

16. The device of claim 1 wherein said hinge is configured to permit rotation of said second housing section about said second axis when the first and second housing section are in a folded position.

* * * * *